United States Patent [19]

Galcik

[11] Patent Number: 5,033,967
[45] Date of Patent: Jul. 23, 1991

[54] ADF WIND CORRECTION SIMULATOR

[76] Inventor: Joseph J. Galcik, 215 Horace Ave., Palmyra, N.J. 08065

[21] Appl. No.: 514,765

[22] Filed: May 29, 1990

[51] Int. Cl.[5] ........................ G09B 11/04; G09B 11/06
[52] U.S. Cl. .................................... 434/243; 434/146; 434/239; 434/244
[58] Field of Search ................. 434/49, 111, 130, 139, 434/140, 146, 186, 239, 243, 244, 284, 289, 402, 404, 405

[56] References Cited

U.S. PATENT DOCUMENTS

| | | | |
|---|---|---|---|
| 2,373,959 | 4/1945 | Horr | 434/186 |
| 2,402,271 | 6/1946 | Andrews | 434/243 |
| 2,404,386 | 7/1946 | Levine et al. | 434/243 |
| 4,095,351 | 6/1978 | Eisele | 434/243 |
| 4,226,028 | 10/1980 | Robson | 434/243 |
| 4,608,022 | 8/1986 | Bellofatto | 434/243 |
| 4,790,758 | 12/1988 | Bellofatto | 434/243 |

FOREIGN PATENT DOCUMENTS 0524295  4/1956  Canada .............................. 434/243

Primary Examiner—Richard J. Apley
Assistant Examiner—Joe H. Cheng

[57] ABSTRACT

An aviation training aid to facilitate the learning of instrument flying techniques. Primarily designed for the application of wind drift problems associated with tracking a straight course over the ground which making an NDB (non-directional beacon) instrument landing approach. This device includes a model airplane that rotates freely through 360 degrees with a compass azimuth card pointer and ADF (automatic direction finding) card rotating on the same axis. The compass azimuth card is controlled by a vertical shaft or handle placed through the center axis, enabling the user to keep the pointer oriented to designated north while reading the airplane's heading in the cutout provided in the airplane's nose (this is the simulated magnetic heading of the aircraft). The wingtip and reciprocal bearings are also provided through cutouts string, simulating the direct bearing to the NDB radio station is also connected from the center post to the designated NDB radio station (push pin). The ADF card that revolves on top of the airplane gives a true presentation of the ADF (automatic direction finding) bearing while simulating a landing approach.

6 Claims, 2 Drawing Sheets

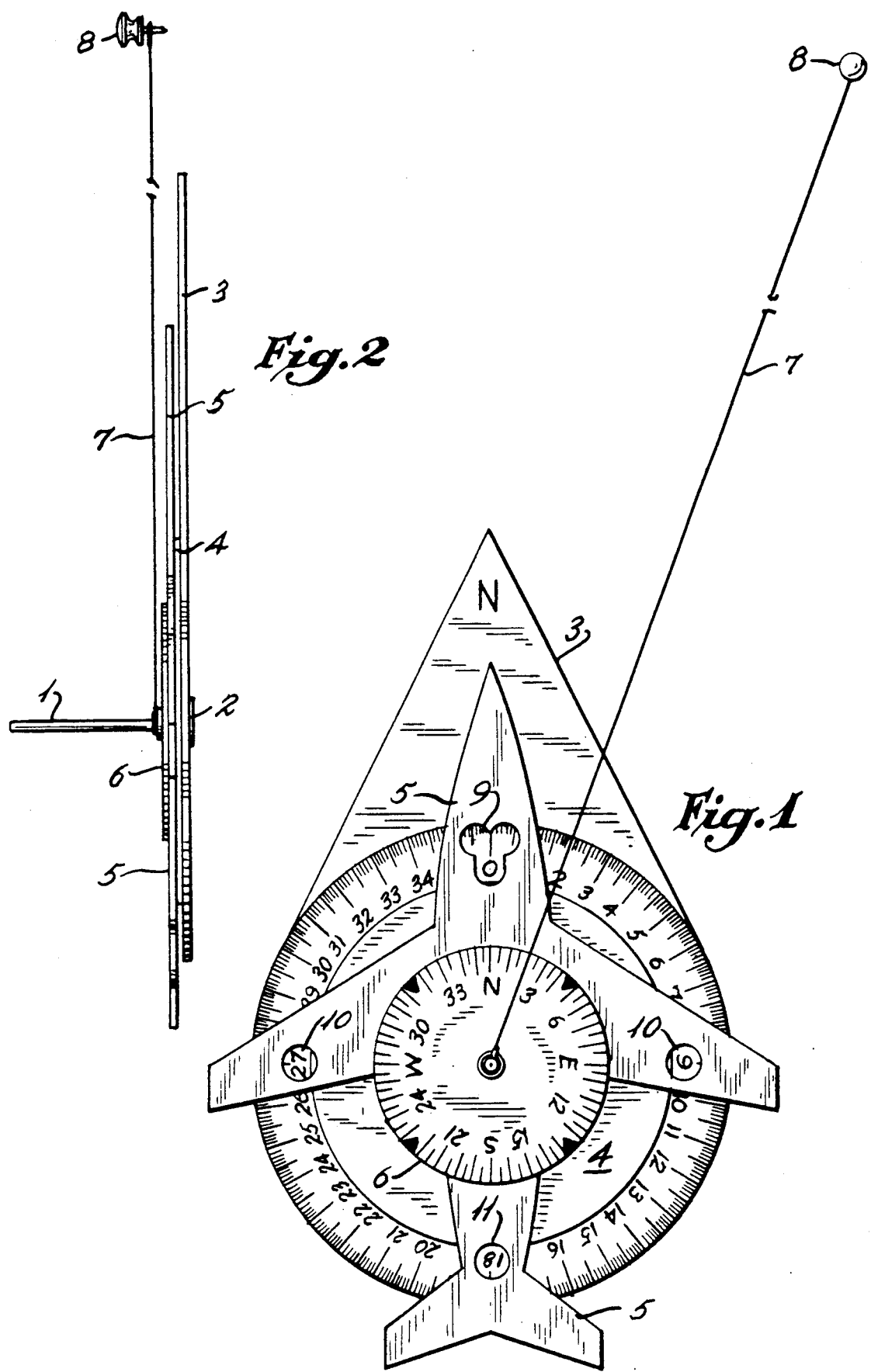

ADF WIND CORRECTION SIMULATOR

FIELD OF INVENTION

This invention relates to Aviation Science and specifically to wind correction while making an NDB approach.

DISCUSSION OF PRIOR ART

Heretofore, ADF simulators were complex in nature and did not readily demonstrate the corrective action to be taken while flying in a windy condition, which is the very problem of making a successful approach. The prior art lacks the mental picture that my invention provides. The prior art does not reduce the mental arithmetic that is so confusing when trying to track over a course line while maintaining proper heading of the aircraft.

OBJECTS

Accordingly, several objects of my invention are:
(1) simplicity (1 movement)
(2) compactness (made from flat stock)
(3) attractive (pilot appeal)
(4) inexpensive to mass produce
(5) gives the user profound result(s) instantly

BRIEF DESCRIPTION OF DRAWINGS

FIG. 1 is a view from the top with string extended to tack. Broken line on string indicates string can be any length desired.

FIG. 2 is a side view to show grommet and center post arrangement. Again, string is shown extended to tack.

DESCRIPTION

Figure 3:
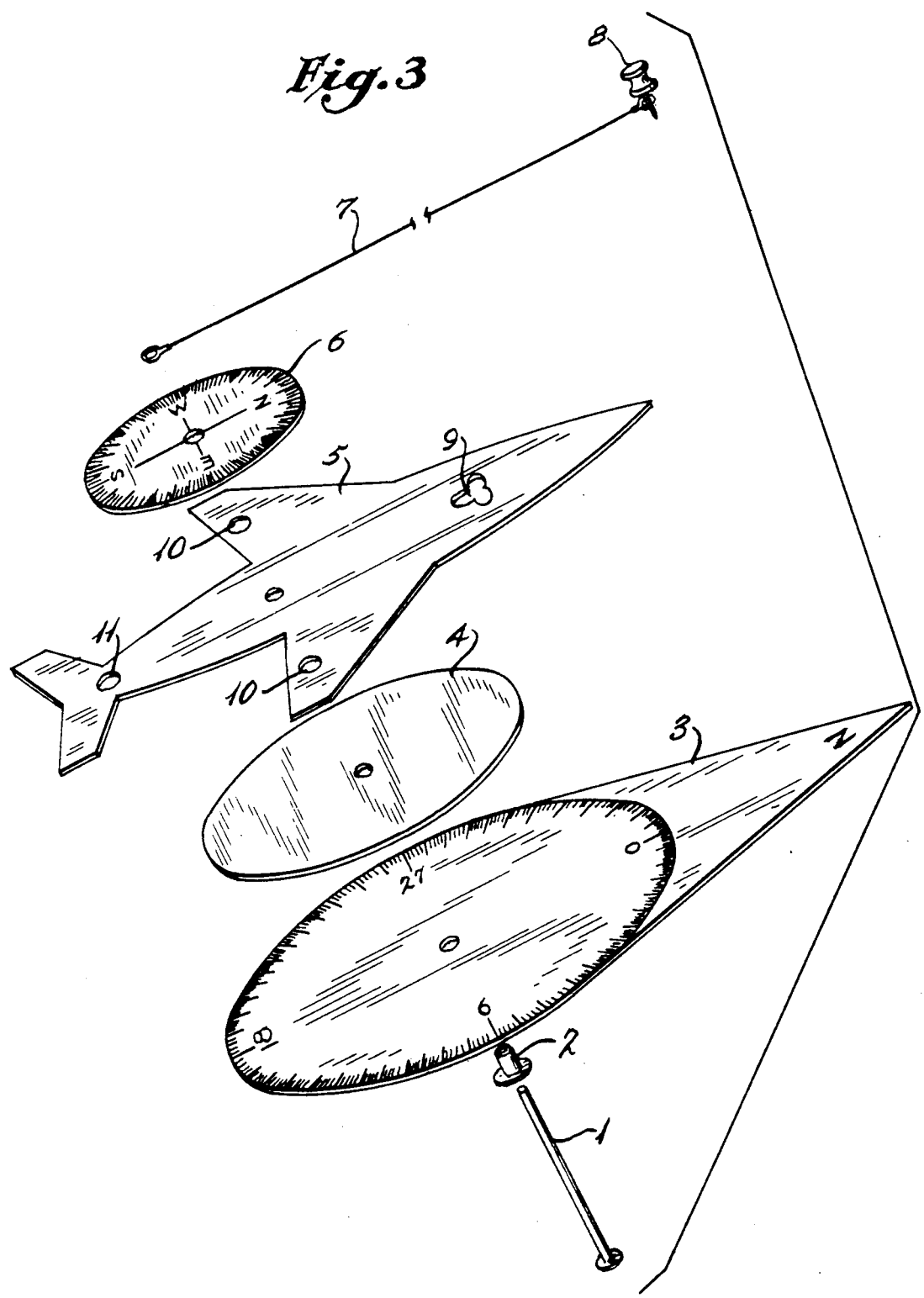
FIG. 3 is exploded view showing eight parts: post 1, grommet 2, compass pointer 3, spacer disc 4, airplane 5, ADF compass card 6, string 7, and tack 8.

The ADF wind correction simulator consists of eight parts. Referring to FIG. 1–3 is the post (1) that extends up through the grommet (2). The post functions as center bearing for the string (7), as well as a handle. The post can be made from metal or plastic but must fit snugly once it is placed up through the grommet so as not to loose control of the compass pointer (3).

The grommet (2) that supports the other parts and allows the airplane to rotate around the vertical axis. It is made of metal and should be flared with a flaring tool once the parts are in place.

The compass pointer (3) made of stiff paper, plastic, or metal. It is a teardrop shape, allowing it to be pointed in the desired direction. The circular portion is a compass with 360 degrees of graduated markings around the azimuth. This serves as the compass heading that shows through the airplane window (9).

The spacer disc (4) which gives some relief from friction while riding between the compass pointer and airplane. It also adds an accent to the compass numbers. It can be made of paper, plastic, or metal and should be of a different color then the compass pointer for contrast.

The airplane (5) which rides on the spacer (4). The airplane can be made from paper, plastic, or metal. The airplane rotates around the vertical axis on the spacer, (4) being held in place by the grommet. There are four holes cut out at each cardinal point of the airplane, cockpit (9), wingtips (10), and tail (11). These holes allow the viewer to sight his heading, wingtip bearing, and reciprocal bearing directly off the compass pointer (3).

The ADF (Automatic Direction Finder) compass card (6). It is permanently attached to the airplane, (5) and revolves on the same axis. It can be made of paper, plastic, or metal. It is marked with graduated lines, 5 degrees apart, around the azimuth.

The string (7), which should be strong and visible. It is attached to the post, (1), then pinned arbitrarily by the user. The string should be at least 10 inches in length.

A common thumb tack (8) used to hold the string, (7), in place.

DESCRIPTION

The ADF Wind Correction Simulator is a hand-controlled device incorporating a model airplane with cutouts on the nose, wingtips and tail. The airplane rotates on a common axis with the compass azimuth pointer printed with one degree increments totaling 360 degrees. A simulated ADF (automatic direction finding) compass card is also employed printed with five degree increments totaling 360 degrees and also revolves around the same axis. There is a spacer between the airplane and compass azimuth/pointer to relieve friction. All three components are held together with an open eye grommet set in the center of the unit. Material used to make this device can be anything with a stiff nature, such as thick paper, thin cardboard, metal, plastic, wood or fiber. The center eye grommet receives a vertical post that is used to (1) effectively control the unit (hold the compass/pointer in a designated north position (2) serves as an attach point for the (NDB) bearing indicator (string). Any rigid material can be used for the post, such as metal or plastic. A good quality string is used for the bearing line running from the vertical post to the designated NDB radio station.

OPERATION

One of the more perplexing problems a student of aviation faces is wind drift correction in (IFR) instrument flying rules/conditions. Flying inside a cloud, or fog. With this device a student can get a clear picture of the problem before encountering the real thing.

To use this device we must assume there is a wind trying to blow us off course (ground track). (FAR) federal air regulations maintain that a pilot must keep his aircraft on course even when there is no visible outside reference.

If we assume the wind is blowing from the northwest (330 degrees) at 30 knots and our aircraft is on a 030 degree heading—set in the window of our airplane, and also assume that the NDB radio station is directly ahead at 090 degrees, we have a typical set of conditions.

The best way to use this device is to obtain a piece of 2 ft. by 2 ft. cardboard to hold the push pin in place. It is also advised to make a wind arrow out of cardboard to constantly remind us of the wind.

Place the simulator on the cardboard and then pin the string two-thirds up on the board. The push pin is our simulated NDB radio station. The string is our visual bearing to the station.

The NDB radio station can be homed in only if the aircraft is equipped with a receiver and an ADF automatic direction finding display, which is a compass card under a needle that will always point to the station that is turned in (just like an AM radio). The ADF card that rotates over our model airplane does the same thing but now the string takes the place of the needle, giving an exact simulation.

The ADF card should be set (N) north to align with the nose of the airplane. This is the easiest way to begin. Later, a student can set up different problems but that is not our concern here.

Since our airplane is pointed at the NDB station (030 degrees—straight ahead) the pointer is 30 degrees to the left. This will be our selected north. We will keep the pointer in that general direction by holding the post with one hand, the airplane can be rotated for heading changes with the other. (Note that the pointer keeps the mind on north which is very important as a teaching aid.)

Assume now that the wind is blowing us off course to the right. Observe the string/needle while moving the unit to the right. When the string/needle shows a 10 degree deflection on the ADF card, we will be 10 degrees off of our desired ground track. To compensate for drift, we must double the 10 degrees to 20 degrees in order to get back on ground track. This actually depends on the strength of the wind and will change with proximity to the NDB station. To keep things simple, we'll concentrate on this one example.

First Corrective Action

1. Change heading of the airplane.

In this case we will correct into the wind 20 degrees (heading in airplane window will now read 010 degrees), rotate the airplane with one hand while holding the post with the other.

Second Correction Action

2. Rotate ADF card 20 degrees opposite (away from wind direction). ADF card now shows 340 degrees straight up (aligned with aircraft nose) or a 10 degree left deflection from North on the ADF card (remember that the string is the needle on the ADF display.

Result

You must assume our model has powered itself into the wind. Move the unit slowly to the left while observing the bearing on the ADF card. Also, keep in mind that our airplane heading is 010 degrees. Keep the pointer north. When the ADF card shows the string/needle over north, we are back on ground travel. If we keep going, we will pass through our desired bearing, or over-shoot our ground track.

Third Correction Action

1. Hold compass pointer in place with center post.

2. Reduce heading of airplane 10 degrees to allow drift to stabilize (our new heading in the airplane window is 020 degrees).

3. Take note that the ADF card is now holding a 10 degree deflection. If the string/needle moves left or right, we are still drifting. If we hold our heading of 020 degrees and our ADF card shows no drift from the 10 degree correction, our aircraft will stay on ground track. This is exactly how the track is maintained.

A device to demonstrate the wind correction action necessary to complete a NDB approach.

I claim:

1. A navigational simulator and training aid for teaching automatic direction finding (ADF) wind correction techniques comprises:

an ADF wind correction simulating means including:

a post;

a teardrop shape azimuth compass pointer disc having a pointer at the apex allowing the pointer to be set in the desired direction, a circular portion with 360 degrees of graduated markings around the circumference of said circular portion, and an annular opening on center of said circular portion;

a spacer disc imposed upon said azimuth compass pointer disc, said spacer disc having an annular opening on the center of said spacer disc;

a simulated model airplane disc imposed upon said spacer disc, said airplane disc having an annular opening on the center of said airplane disc, and four cutout windows at the cockpit, left and right wingtips and tail of said airplane disc for allowing the user to sight the heading, wingtip bearing and reciprocal bearing directly from said azimuth compass pointer disc;

a simulated ADF azimuth compass disc coupled upon said airplane disc, said ADF compass disc having five degrees of graduated markings around the circumference of said ADF azimuth compass disc, and an annular opening at the center of said ADF azimuth compass disc and;

a string for indicating the direct bearing to the nondirectional beacon (NDB) radio station; and a thumbtack means for simulating said (NDB) radio station;

wherein the distal end of said post extended through the vertical axis of said annular openings of said azimuth compass pointer disc, said spacer disc, said airplane disc and said ADF azimuth compass disc, wherein said spacer disc relieves friction between said azimuth compass pointer disc and said airplane disc such that rotating said airplane disc without disturbing said azimuth pointer disc, and wherein one end of said string coupled to said post upon said ADF azimuth compass disc and the other end of said string coupled to said thumbtack means;

whereby one hand of said user holding the proximal end of said post away from said thumbtack means at the same time rotating the said compass azimuth pointer with said vertical post, then the other hand of said user, rotation said airplane disc to facilitate heading corrections while simulating said NDB radio station approach;

2. The navigational simulator and training aid of claim 1 wherein said azimuth compass pointer disc, said spacer disc, said airplane disc and said ADF azimuth disc are made from paper.

3. The navigational simulator and training aid of claim 1 wherein said azimuth compass pointer disc, said spacer disc, said airplane disc and said ADF azimuth disc are made from plastic.

4. The navigational simulator and training aid of claim 1 wherein said azimuth compass pointer disc, said spacer disc, said airplane disc and said ADF azimuth disc are made from metal.

5. The navigational simulator and training aid of claim 1 wherein said post is made from plastic.

6. The navigational simulator and training aid of claim 1 wherein said post is made from metal.

* * * * *

UNITED STATES PATENT AND TRADEMARK OFFICE
CERTIFICATE OF CORRECTION

PATENT NO. : 5,033,967

DATED : July 23, 1991

INVENTOR(S) : Joseph J. Galcik

It is certified that error appears in the above-identified patent and that said Letters Patent is hereby corrected as shown below:

On the title page: Abstract, line 16, "also provided through cutouts string" should read--also provided through cutouts. A string,--.

Signed and Sealed this

Thirty-first Day of March, 1992

Attest:

HARRY F. MANBECK, JR.

*Attesting Officer*  *Commissioner of Patents and Trademarks*